United States Patent [19]

Markovs

[11] Patent Number: 4,596,685
[45] Date of Patent: Jun. 24, 1986

[54] OXYETHYLATED AROMATIC AMINES AND THEIR USE AS CHAIN EXTENDERS IN THE PREPARATION OF POLYURETHANE-POLYUREA ELASTOMERS

[75] Inventor: Robert A. Markovs, Grosse Ile, Mich.

[73] Assignee: BASF Corporation, Wyandotte, Mich.

[21] Appl. No.: 662,058

[22] Filed: Oct. 18, 1984

[51] Int. Cl.[4] .............................................. C08G 18/14
[52] U.S. Cl. .................................. 264/51; 264/328.1; 264/328.6; 264/328.8; 521/159; 521/167; 528/60; 528/77
[58] Field of Search .................... 264/51, 328.1, 328.6, 264/328.8; 521/159, 167; 528/60, 77

[56] References Cited

U.S. PATENT DOCUMENTS

| 3,159,591 | 12/1964 | Lanham | 521/107 |
|---|---|---|---|
| 3,499,009 | 3/1970 | Odinak et al. | 528/271 |
| 3,597,371 | 8/1971 | Britain | 521/167 |
| 4,209,609 | 6/1980 | Haas | 528/421 |
| 4,342,842 | 8/1982 | Hira et al. | 521/167 |
| 4,397,966 | 8/1983 | Stolz et al. | 521/167 |

Primary Examiner—Maurice J. Welsh
Attorney, Agent, or Firm—Norbert M. Lisicki

[57] ABSTRACT

This invention relates to oxyethylated toluenediamine and diaminodiphenylmethane and their use as chain extenders in the preparation of polyurethane-polyurea elastomers.

7 Claims, No Drawings

OXYETHYLATED AROMATIC AMINES AND THEIR USE AS CHAIN EXTENDERS IN THE PREPARATION OF POLYURETHANE-POLYUREA ELASTOMERS

BACKGROUND OF THE INVENTION

1. Field of the Invention

This invention relates to oxyethylated aromatic amines and their use as chain extenders in the preparation of polyurethane-polyurea elastomers.

2. Description of the Prior Art

U.S. Pat. No. 3,499,009 teaches the oxyalkylation of a polyamine by reacting first with 2 to 20 molar equivalents of ethylene oxide followed by 2 to 20 molar equivalents of a $C_3$–$C_5$ vicinal alkylene oxide. These products are employed for the preparation of rigid polyurethane foams.

U.S. Pat. No. 4,209,609 teaches the oxyalkylation of toluenediamine with 3 to 5 moles of ethylene oxide and second with 1 to 5 moles of a $C_3$–$C_9$ vicinal alkylene oxide. There is no teaching that ethylene oxide adducts of toluenediamine or diamino diphenyl methane may be employed as a chain extender in the preparation of elastomers displaying good heat sag and good molulus/temperature properties. An additional benefit of these chain extenders lies in their solubility in polyoxyalkylene polyether polyols. Conventional RIM chain extenders such as ethylene glycol or butanediol are not soluble in polyether polyols and will undergo phase separation if the mixtures are not agitated.

SUMMARY OF THE INVENTION

The subject invention relates to a process for preparing a polyurethane-polyurea elastomer employing as the chain extender from about 1 to 50 parts of an oxyethylated amine selected from the group consisting of the following:

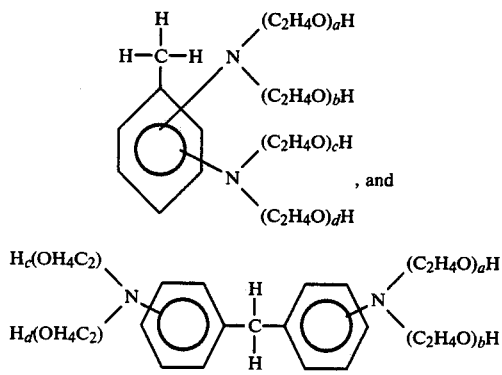

said parts being based on 100 parts of polyol, wherein the sum of a+b+c+d is from about 2 to about 10, preferably when the sum of a+b+c+d is about 2.

The polyurethane-polyurea elastomers have unexpected and improved properties when compared to polyurethane elastomers which are prepared by using ethylene glycol and 1,4-butanediol as the chain extender. In particular the elastomers exhibit good heat sag and modulus ratio properties.

DESCRIPTION OF THE PREFERRED EMBODIMENTS

In order to prepare the polyurethane-polyurea elastomers of the subject invention, an organic polyisocyanate is reacted with a polyol having an average molecular weight of 1000 to 10,000 containing two to eight active hydrogen atoms, as determined by the Zerewitinoff method, and a mixture of oxyalkylated aromatic amines. Catalysts, blowing agents, fillers, surfactants, and various other ingredients may also be incorporated into the reaction mixture. The molded polyurethane-polyurea elastomers are preferably prepared by the use of reaction injection molding.

In preparing the polyurethane-polyurea elastomers of the subject invention, any conventional organic polyisocyanate, modified organic polyisocyanate, or quasi prepolymer can be used, as well as mixtures thereof. Representative conventional organic polyisocyanates correspond to the following formula:

$$R''(NCO)_z$$

wherein R'' is a polyvalent organic radical which is either aliphatic, aralkyl, alkaryl, aromatic or mixtures thereof, and z is an integer which corresponds to the valence of R'' and is at least two. Representative of the organic polyisocyanates contemplated herein include, for example, aromatic diisocyanates such as 2,4-toluene diisocyanate, 2,6-toluene diisocyanate, mixtures of 2,4- and 2,6-toluene diisocyanate, crude toluene diisocyanate, 4,4'-diphenylmethane diisocyanate, 2,4'-diphenylmethane diisocyanate, mixtures of 4,4'- and 2,4'-diphenylmethane diisocyanate, polymethylene polyphenyl isocyanates, mixtures of diphenylmethane diisocyanates and polymethylene polyphenyl polyisocyanates, and the like; aromatic triisocyanates such as 4,4',4''-tri-phenylmethane triisocyanate, 2,4,6-toluene triisocyanates; aromatic tetraisocyanates such as 4,4'-dimethyldiphenylmethane-2,2',5,5'-tetraisocyanate, and the like; arylalkyl polyisocyanates such as xylene diisocyanate; aliphatic polyisocyanates such as hexamethylene-1,6-diisocyanate, lysine diisocyanate methylester and the like, and mixtures thereof. Other organic polyisocyanates include hydrogenated methylene diphenylisocyanate, m-phenylene diisocyanate, naphthalene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate. These polyisocyanates are prepared by conventional methods known in the art such as the phosgenation of the corresponding organic amine.

As mentioned above, isocyanates which are modifications of the above isocyanates which contain carbodiimide, allophanate or isocyanurate structures may also be used. Quasi-prepolymers may also be employed. These quasiprepolymers are prepared by reacting an excess of organic polyisocyanate or mixtures thereof with a minor amount of an active hydrogen-containing compound as determined by the well-known Zerewitinoff test, as described by Kohler in *Journal of the American Chemical Society*, Vol. 49, page 3181 (1927). These compounds and their methods of preparation are well known in the art. The use of any one specific active hydrogen compound is not critical hereto, rather any such compound can be employed herein. Generally, the quasiprepolymers have a free isocyanate content of from 20 percent to 40 percent by weight.

In order to prepare polyurethane-polyurea elastomers, the organic polyisocyanates are reacted with one or more compounds having an average molecular weight from 1000 to 10,000 containing two to eight active hydrogen atoms as determined by the Zerewitinoff method described previously. Preferably the active hydrogen containing compounds have an average molecular weight from 1000 to 10,000. Examples of such compounds include, but are not limited to, hydroxyl-terminated polyesters; polyoxyalkylenepolyether polyols; graft polymer dispersions in polyoxyalkylenepolyether polyols; alkylene oxide adducts of organic compounds having at least two reactive hydrogen atoms such as amines and thiols; and hydroxy terminated acetals. These compounds will now be more specifically described.

Any suitable hydroxy-terminated polyester may be used such as are obtained, for example, from the reaction of polycarboxylic acids or polycarboxylic acid anhydrides and polyhydric alcohols. Any suitable polycarboxylic acid may be used in the preparation of hydroxy-terminated polyesters such as succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-butyl-α-ethyl-glutaric acid, α,β-diethylsuccinic acid, phthalic acid, isophthalic acid, terephthalic acid, hemimellitic acid, and 1,4-cyclohexanedicarboxylic acid. Anhydrides such as phthalic, tetrachlorophthalic, tetrabromophthalic, maleic, and 1,4,5,6,7,7-hexachlorobicyclo-(2,2,1)-5-heptane-2,3-dicarboxylic acid anhydride also may be used in the preparation of the hydroxy-terminated polyesters. Any suitable polyhydric alcohol, including both aliphatic and aromatic, may be reacted with the polycarboxylic acid or polycarboxylic acid anhydride to prepare the hydroxy-terminated polyesters. Representative examples include ethylene glycol, 1,3-propanediol, 1,2-propane glycol, 1,4-butanediol, 1,3-butanediol, 1,2-butane glycol, 1,5-pentanediol, 1,4-pentanediol, 1,3-pentanediol, 1,6-hexanediol, 1,7-heptanediol, 2-butene-1,4-diol glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenolic compounds such as 2,2-bis(4-hydroxyphenyl)propane, commonly known as Bisphenol A and hydroxyalkyl ethers of such phenolic compounds such as bis-2-hydroxyethyl ether of hydroxyquinone, and the alkylene oxide adducts of the above-named polyhydric alcohols.

The hydroxy-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxy-terminated polyester with only a portion of the components being a diamine such as ethylenediamine. The hydroxy-terminated polyester may also be a hydroxy-terminated polycaprolactone polyol.

Polyoxyalkylene ether polyols are preferably used as the polyol. These compounds are prepared by reacting an alkylene oxide with a polyhydric alcohol. Any suitable polyhydric alcohol may be used in the preparation of the polyoxyalkylene polyether polyol, such as those disclosed above for use in the preparation of the hydroxy-terminated polyesters. Any suitable alkylene oxide may be reacted with the polyhydric alcohol to prepare the polyoxyalkylene polyol. Representative examples include ethylene oxide, propylene oxide, butylene oxide, amylene oxide, styrene oxide, or mixtures thereof. Polyoxyalkylene polyols derived from two or more oxides may possess either block or heteric structure. In addition to polyoxyalkylene polyols, other compounds such as polyols derived from tetrahydrofuran and alkylene oxide-tetrahydrofuran mixtures may be used. The polyoxyalkylene polyether polyols preferably have primary hydroxyl groups, but may have secondary hydroxyl groups, and preferably, are polyethers prepared from alkylene oxides having from two to six carbon atoms such as polyethylene ether glycols, polyoxypropylene ether glycols and polyoxybutylene ether glycols. The polyoxyalkylene polyether polyols may be prepared by any known process such as, for example, the process disclosed by Wurtz in 1859 and in *Encyclopedia of Chemical Technology*, Vol. 7, pp. 257–262, published by Interscience Publishers, Inc. (1951), or the process disclosed in U.S. Pat. No. 1,922,459. Alkylene oxide adducts of Mannich condensation products are also useful in the invention.

In addition to the polyoxyalkylene polyether polyols just described, graft polymer dispersions in polyoxyalkylene polyether polyols may also be used in the preparation of the reactive polyol composition. These polyols are prepared by the in situ polymerization of a vinyl monomer or monomers in a reactive polyol medium and in the presence of a free radical initiator. The reaction is generally carried out at a temperature ranging from about 40° C. to 150° C. A more comprehensive discussion of the graft polyols and their method of preparation can be found in U.S. Pat. Nos. 4,208,314, 3,383,351 (Re. 28,715), 3,304,273, 3,652,639, and 3,823,201 (Re. 29,014), the disclosures of which are hereby incorporated by reference.

As was previously mentioned, other suitable polyols, which can be used in the reactive polyol composition of this invention, include the alkylene oxide adducts of organic compounds having at least 2 active hydrogens, such as amines and thiols. The alkylene oxides which are useful in this regard are the same as those described in connection with the preparation of polyoxyalkylene polyether polyols.

Suitable thiols which may be reacted with an alkylene oxide include alkane thiols containing at least two —SH groups such as 1,2-ethanedithiol, 1,2-propanedithiol, 1,3-propanedithiol, and 1,6-hexanedithiol; and alkenethiols such as 2-butene-1,4-dithiol, and alkynethiols such as 3-hexyne-1,6-dithiol.

Suitable polyamines which can be reacted with an alkylene oxide include aromatic polyamines such as methylene dianiline, polyaryl-polyalkylene polyamine (crude methylene dianiline), p-aminoaniline, 1,5-diaminonaphthalene, and 2,4-diaminotoluene; aliphatic polyamines such as ethylenediamine, 1,3-propanediamine, 1,4-butanediamine, and 1,3-butanediamine, as well as substituted secondary derivatives thereof.

As was previously mentioned, hydroxy-terminated polyacetals may also be used as polyols in accordance with this invention. These may be prepared, for example, by the reaction of formaldehyde or other suitable aldehyde with a dihydric alcohol or an alkylene oxide such as those previously described.

The oxyalkylated aromatic amines which are employed as chain extenders in the preparation of the elastomers of the invention have the following structural formulae:

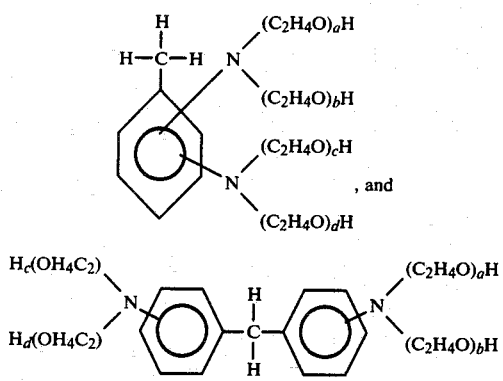

These are prepared by reacting a mixture of 2,4- and 2,6-toluenediamine isomers with from about two moles to about ten moles of ethylene oxide employing procedures well known to those skilled in the art. The 2,4'- and 4,4'-diaminodiphenylmethane oxyethylated products are produced in a similar fashion.

In some cases, it may also be advantageous to replace partially the previously described oxyalkylated vicinal toluenediamines by other chain extenders. The chain extenders advantageously have molecular weights of less than 400, preferably of 30 to 300, and preferably have 2 active hydrogen atoms. Examples of chain extenders include aliphatic and/or araliphatic diols having 2 to 14, preferably 2 to 6 carbon atoms such as ethylene glycol, 1,10-decanediol, diethylene glycol, dipropylene glycol, 1,4-butanediol, 1,6-hexanediol and bis(2-hydroxyethyl)hydroquinone.

Secondary aromatic diamines can also be used as chain extenders. Examples include N,N'-dialkyl-substituted aromatic diamines wherein the n-alkyl radicals have 1 to 20, preferably 1 to 4, carbon atoms such as N,N'-diethyl-, N,N'-di-secondary butyl-, N,N'-dicyclohexyl-4,4'-diaminodiphenylmethane and N,N'-di-secondary butylbenzidine. Other chain extenders include 3,3',5,5'-alkyl-substituted 4,4'-diaminodiphenylmethanes such as 3,3',5,5'-tetramethyl-, -tetraethyl-, and -tetra-n-propyl-, tetraisopropyl 4,4'-diaminodiphenylmethane.

In addition to the previously described ingredients, other ingredients such as surfactants, fillers, pigments, blowing agents, and catalysts can be included in the preparation of the polyurethane-polyurea elastomers. These ingredients are usually added to the polyol before reaction with the organic isocyanate to form a resin component which is then reacted with the isocyanate component.

Surfactants which can be used include polyoxyalkylene derivaties of siloxane or the alkylene oxide adducts of organic compounds containing reactive hydrogen atoms such as the ethylene oxide adducts of alcohols, glycols and phenols. Generally, the surfactants are employed in amounts ranging from about 0.01 part to 5 parts by weight per 100 parts of polyol.

Conventional fillers for use herein include, for example, aluminum silicate, calcium silicate, magnesium silicate, calcium carbonate, barium sulfate, calcium sulfate, glass fibers, flaked glass, carbon black, and silica. The filler, if used, is normally present in an amount ranging from about 5 parts to 50 parts by weight per 100 parts of resin.

A pigment which can be used herein can be any conventional pigment heretofor disclosed in the art such as titanium dioxide, zinc oxide, iron oxide, antimony oxide, chrome green, chrome yellow, iron blue siennas, molybdate oranges, and organic pigments such as para reds, benzidine yellow, toluidine red, toners, and phthalocyanines.

Conventional blowing agents such as halohydrocarbons, hydrocarbons and the like, can be employed herein in their conventional mode. Representative examples include halogenated hydrocarbons such as monochlorodifluoromethane, dichloromonofluoromethane, dichlorofluoromethane, and trichlorofluoromethane, and hydrocarbons such as propane and isobutane.

Any of the catalysts employed in the preparation of polyurethane foam can be employed in the subject invention. Representative of these catalysts include the tertiary amine catalysts such as diethylenetriamine, ketimine, tetramethylenediamine, triethylenediamine, tetramethylenediamine, tetramethylguanidine, trimethylpiperazine and the metalo-organic salt catalysts which are polyvalent metal salts of an organic acid having up to about 18 carbon atoms and being void of active hydrogen atoms. The organo portion of the salt may be either linear or cyclic or saturated or unsaturated. Generally, the polyvalent metal has a valence from about 2 to 4. Typical of these salts include: stannous acetate, stannous butyrate, stannous 2-ethylhexoate, stannous laurate, stannous oleate, stannous stearate, stannous octoate, lead cyclopentanecarboxylate, cadmium cyclohexanecarboxylate, lead naphthenate, lead octoate, cobalt naphthenate, zinc naphthenate, bis(phenylmercury)-dodecyl succinate, phenylmercuric benzoate, cadmium naphthenate, dibutyltin dilaurate and dibutyltin-di-2-ethylhexoate. Generally these catalysts will be employed in amounts ranging from about 0.01 part to 7.5 parts by weight based on the weight of the compound having an average molecular weight of 1000 to 10,000 containing two or more active hydrogen atoms.

In general, the polyurethane-polyurea elastomers of the present invention are prepared by mixing together the ingredients mechanically and/or by the use of high pressure machinery. The ratio of reactants is such that from 0.7 equivalent to 1.4 equivalents of isocyanate is present per equivalent of active hydrogen atoms contained in the mixture of polyol and ethoxylated amine. Preferably from 0.9 equivalent to 1.15 equivalents of isocyanate is present per equivalent of active hydrogen atom. As was previously mentioned, the polyol compositions described herein for the preparation of polyurethane-polyurea elastomers are particularly useful for the preparation of molded products by reaction injection molding techniques.

The Examples which follow will illustrate in more detail the practice of this invention. They are not intended to limit the scope of its application. The parts referred to in the Examples are by weight unless otherwise specified, and the temperatures are in degrees centigrade unless otherwise specified.

The following abbreviations will be used in the Examples:

Polyol A is a propylene oxide-ethylene oxide adduct of trimethylolpropane having a molecular weight of 4100, a hydroxyl number of 35, and containing 13 percent ethylene oxide.

Polyol B is a graft polymer dispersion containing 21 percent 2.3 acrylonitrile:styrene having a molecular weight of 4800 and a hydroxyl number of 28. The dispersion was prepared by free radical polymerization in Polyol C.

Polyol C is a propylene oxide-ethylene oxide adduct of glycerine and propylene glycol having a molecular weight of 3800, a hydroxyl number of 35, and containing 14 percent ethylene oxide.

Polyol D is a graft polymer dispersion containing 21 percent, 1:1 acrylonitrile:styrene having a molecular weight of 4800 and a hydroxyl number of 28. The dispersion was prepared by free radical polymerization in Polyol C.

Polyol E is a two mole ethylene oxide adduct of a mixture of 2,4- and 2,6- isomers of toluenediamine.

Polyol F is a two mole ethylene oxide adduct of a mixture of 2,4'- and 4,4'- diaminodiphenylmethane.

EG is ethylene glycol.

BDD is 1,4-butanediol.

Isocyanate A is an isocyanate terminated prepolymer prepared by the reaction of diphenylmethane diisocyanate with a polypropylene glycol having a molecular weight of 2000 and a polypropylene glycol having a molecular weight of 200 and blended in equal proportions with a carbodiimide modified diphenylmethane diisocyanate having an NCO content of 26 percent.

T-12 a catalyst sold by M&T Corporation.

Isocyanate B is a carbodiimide modified diphenylmethane diisocyanate having an NCO content of 29.3 percent sold by Upjohn Corporation as Isonate 143L.

Isocyanate C is an isocyanate terminated prepolymer prepared by the reaction of diphenylmethane diisocyanate with a mixture of dipropylene and tripropylene glycol having an NCO content of 23 percent.

Isocyanate D is polymeric carbodiimide modified diphenylmethane diisocyanate having an NCO content of 30 percent sold by Upjohn Corporation as Isonate 191.

EXAMPLES 1-35

All of the formulation ingredients as tabulated hereinafter were preblended and charged to one tank and maintained at a temperature of 95° F. of a Puromat 30/2 molding machine while Isocyanate A was charged to another tank and maintained at a temperature of 80° F. The ingredients were circulated through a single mixing head with the isocyanate feed at a pressure of 210 bar and the resin feed at 195 bar. The output of the machine was varied from 100 grams/second to 500 grams/second. The isocyanate/resin mixture was fed into a mold held at a temperature of 145° F. The demold time was 60 seconds. The resultant plaque was post cured at 250° F. for 60 minutes. The physical properties were then determined employing standard ASTM procedures as listed in ASTM D 3488. The coefficient of thermal expansion was determined employing ASTM D 696-79. All of the formulations contained 0.1 pbw of T-12 catalyst. Examples 20-23 were prepared with Isocyanate C, Examples 30 and 31 were prepared with Isocyanate D and Examples 32-35 were prepared with Isocyanate B.

TABLE I

| Example | 1 | 2 | 3 | 4 | 5 | 6 | 7 |
|---|---|---|---|---|---|---|---|
| Formulation, pbw | | | | | | | |
| Polyol A | 65 | 65 | 80 | 80 | 80 | 80 | 80 |
| Polyol F | 35 | 35 | 20 | 20 | 10 | 10 | 15 |
| EG | — | — | — | — | 10 | — | 5 |
| BDO | — | — | — | — | — | 10 | — |
| Isocyanate A | 71.3 | 76.8 | 45.0 | 48.6 | 84.8 | 67.3 | 61.8 |
| Index | 100 | 108 | 100 | 108 | 108 | 108 | 100 |
| Physical Properties | | | | | | | |
| Density, pcf | 70.1 | 70.1 | 68.7 | 68.2 | 62.6 | 63.4 | 65.1 |
| Tensile, psi | 3130 | 3560 | 1500 | 1555 | 2700 | 1712 | 2270 |
| Elongation, % | 20 | 25 | 25 | 50 | 100 | 110 | 130 |
| Graves Tear, pi | 379 | 423 | 227 | 234 | 304 | 218 | 235 |
| Shore "D" Hardness | 53/53 | 54/54 | 35/35 | 37/37 | 43/42 | 35/35 | 31/31 |
| 250° F. Heat Sag, inches | 0.06 | 0.08 | 0.37 | 0.36 | 1.10 | 1.40 | 1.58 |
| Flex Recovery, degrees | 26/21 | — | 17/9 | 16/8 | — | — | 10/5 |
| Flexibility Modulus × $10^3$ | | | | | | | |
| −20° F. | 40.8 | 56.5 | 11.2 | 13.7 | 51.4 | 41.7 | 25.9 |
| 72° F. | 30.0 | 32.2 | 11.2 | 11.2 | 21.2 | 10.5 | 7.1 |
| 158° F. | 25.9 | 25.6 | 9.5 | 9.6 | 9.3 | 3.0 | 4.4 |
| Ratio −20° F./158° F. | 1.57 | 1.57 | 1.19 | 1.43 | 5.52 | 13.9 | 5.89 |
| Coefficient of Thermal Expansion in./in., °F., $10^{-6}$ | 72 | 77 | 89 | 89 | 120 | 150 | 74 |

| Example | 8 | 9 | 10 | 11 | 12 | 13 | 14 |
|---|---|---|---|---|---|---|---|
| Formulation, pbw | | | | | | | |
| Polyol A | 80 | 80 | 80 | 80 | 80 | 80 | 80 |
| Polyol F | 15 | 5 | 5 | 10 | 10 | 15 | 15 |
| EG | 5 | — | — | — | — | — | — |
| BDO | — | 15 | 15 | 10 | 10 | 5 | 5 |
| Isocyanate A | 66.7 | 71 | 76.7 | 62.3 | 67.4 | 53.7 | 58 |
| Index | 108 | 100 | 108 | 100 | 108 | 100 | 108 |
| Physical Properties | | | | | | | |
| Density, pcf | 63.6 | 64.9 | 62.6 | 62.6 | 62.4 | 65.4 | 62.9 |
| Tensile, psi | 2100 | 2410 | 2200 | 2000 | 2150 | 1830 | 1700 |
| Elongation, % | 70 | 140 | 60 | 120 | 100 | 70 | 50 |
| Graves Tear, pi | 260 | 298 | 299 | 207 | 238 | 158 | 186 |
| Shore "D" Hardness | 36/34 | 35/35 | 37/34 | 25/24 | 37/37 | 25/24 | 30/30 |
| 250° F. Heat Sag, inches | 1.40 | 2.14 | 1.30 | 2.06 | 1.90 | 1.40 | 1.34 |
| Flex Recovery, degrees | 11/6 | 11/5 | 14/7 | 11/4 | 8/2 | 5/3 | 3/2 |
| Flexibility Modulus × $10^3$ | | | | | | | |
| −20° F. | 49.1 | 53.8 | 83.2 | 37.2 | 53.1 | 19.4 | 29.2 |

TABLE I-continued

| | | | | | | | |
|---|---|---|---|---|---|---|---|
| 72° F. | 12.2 | 7.9 | 12.2 | 11.6 | 9.1 | 4.1 | 6.1 |
| 158° F. | 5.6 | 1.7 | 1.2 | 2.8 | 3.7 | 2.0 | 3.9 |
| Ratio −20° F./158° F. | 8.77 | 31.65 | 69.33 | 13.29 | 14.35 | 9.70 | 7.49 |
| Coefficient of Thermal Expansion in./in., °F., $10^{-6}$ | 78 | 62 | 90 | 101 | 72 | 98 | 98 |

TABLE II

| Example | 15 | 16 | 17 | 18 | 19 | 20 |
|---|---|---|---|---|---|---|
| Formulation, pbw | | | | | | |
| Polyol A | 80 | 65 | 50 | 80 | 80 | 80 |
| Polyol E | 20 | 35 | 50 | 10 | 10 | 5 |
| EG | — | — | — | 10 | 10 | 15 |
| BDO | — | — | — | — | — | — |
| Isocyanate A | 38.0 | 58.8 | 81.8 | 76.0 | 78.3 | — (c) |
| Index | 105 | 105 | 105 | 102 | 105 | 102 |
| Physical Properties | | | | | | |
| Density, pcf | 68.5 | 69.0 | 66.7 | 66.9 | 66.3 | 67.9 |
| Tensile, psi | 1643 | 2400 | 1330 | 2870 | 2800 | 3500 |
| Elongation, % | 150 | 40 | — | 130 | 80 | 190 |
| Graves Tear, pi | 174 | 330 | 164 | 360 | 389 | 660 |
| Shore "D" Hardness | — | 48/48 | 59/58 | 37/37 | 35/35 | 61/55 |
| 250° F. Heat Sag, inches | 1.81 | 0.24 | 0.04 | 1.86 | 1.88 | 0.58 |
| Flex Recovery, degrees | — | — | — | — | — | — |
| Flexibility Modulus × $10^3$ | | | | | | |
| −20° F. | 5.0 | 22.5 | 51.3 | 93.6 | 88.0 | 144.9 |
| 72° F. | 2.0 | 14.2 | 37.0 | 17.6 | 17.6 | 59.8 |
| 158° F. | 1.0 | 11.2 | 35.7 | 5.3 | 2.9 | 8.2 |
| Ratio −20° F./158° F. | 5.0 | 2.01 | 1.44 | 17.66 | 30.34 | 17.67 |
| Coefficient of Thermal Expansion in./in., °F., $10^{-6}$ | 106 | 101 | 51 | 83 | 82 | 82 |

| Example | 21 | 22 | 23 | 24 | 25 |
|---|---|---|---|---|---|
| Formulation, pbw | | | | | |
| Polyol A | 80 | 80 | 80 | 80 | 80 |
| Polyol E | 5 | — | — | 10 | 10 |
| EG | 15 | 20 | 20 | 10 | 10 |
| BDO | — | — | — | | |
| Isocyanate A | — (c) | — (c) | — (c) | 59.8 | 61.8 |
| Index | 105 | 102 | 105 | 102 | 105 |
| Physical Properties | | | | | |
| Density, pcf | 67.5 | 67.0 | 64.2 | 64.3 | 64.1 |
| Tensile, psi | 3600 | 3580 | 3320 | 2000 | 2060 |
| Elongation, % | 190 | 130 | 140 | 150 | 140 |
| Graves Tear, pi | 632 | 741 | 667 | 238 | 227 |
| Shore "D" Hardness | 59/54 | | | 27/27 | 25/25 |
| 250° F. Heat Sag, inches | 0.64 | 0.16 | 0.24 | 1.68 | 1.62 |
| Flex Recovery, degrees | — | — | — | — | — |
| Flexibility Modulus × $10^3$ | | | | | |
| −20° F. | 137.4 | 174.6 | 163.2 | 36.4 | 55.0 |
| 72° F. | 56.4 | 63.3 | 62.6 | 7.3 | 6.2 |
| 158° F. | 2.8 | 9.9 | 9.9 | 1.5 | 1.5 |
| Ratio −20° F./158° F. | 49.07 | 17.64 | 16.48 | 24.27 | 36.67 |
| Coefficient of Thermal Expansion in./in., °F., $10^{-6}$ | 67 | 70 | 89 | 81 | 82 |

TABLE III

| Example | 26 | 27 | 28 | 29 | 30 | 31 |
|---|---|---|---|---|---|---|
| Formulation, pbw | | | | | | |
| Polyol B | 80 | 80 | 80 | 80 | 80 | 80 |
| Polyol | 2.5 | 2.5 | 5 | 5 | — | — |
| Polyol F | — | — | — | — | 2.5 | 5 |
| EG | 20 | 20 | 20 | 20 | 20 | 20 |
| Isocyanate A | 102.6 | 105.7 | 105.3 | 108.4 | — (D) | — (D) |
| Index | 102 | 105 | 102 | 105 | 102 | 102 |
| Physical Properties | | | | | | |
| Density, pcf | 62.5 | 60.0 | 63.8 | 59.8 | 62.8 | 60.0 |
| Tensile, psi | 2420 | 3020 | 3190 | 3310 | 4600 | 4300 |
| Elongation, % | 10 | 20 | 40 | 20 | 50 | 20 |
| Graves Tear, pi | 293 | 397 | 335 | 367 | 558 | 390 |
| Shore "D" Hardness | 58/54 | 57/54 | 61/59 | 59/54 | 68/63 | 63/61 |
| 250° F. Heat Sag, inches | 0.64 | 0.58 | 0.82 | 0.70 | 0.36 | 0.46 |
| Flex Recovery, degrees | 32/25 | 30/21 | 33/25 | 33/26 | — | — |
| Flexibility Modulus × $10^3$ | | | | | | |
| −20° F. | 159.4 | 43.4 | 170.1 | 158.7 | 160.3 | 168.9 |
| 72° F. | 73.5 | 68.6 | 84.1 | 75.6 | 95.6 | 90.7 |

TABLE III-continued

| Example | 26 | 27 | 28 | 29 | 30 | 31 |
|---|---|---|---|---|---|---|
| 158° F. | 23 | 26.1 | 24.6 | 25.2 | 53.1 | 54.8 |
| Ratio −20° F./158° F. | 6.75 | 5.49 | 6.91 | 6.30 | 3.02 | 3.08 |
| Coefficient of Thermal Expansion in./in., °F., 10⁻⁶ | 63 | 66 | 56 | 58 | — | — |

TABLE IV

| Example | 32 | 33 | 34 | 35 |
|---|---|---|---|---|
| Formulation, pbw | | | | |
| Polyol D | 80 | 80 | 80 | 80 |
| Polyol F | 5 | 5 | 10 | 10 |
| EG | 20 | 20 | 20 | 20 |
| Index | 102 | 105 | 102 | 105 |
| Isocyanate B | — | — | — | — |
| Physical Properties | | | | |
| Density, pcf | 65.7 | 64.7 | 65.2 | 63.4 |
| Tensile, psi | 4670 | 4600 | 4420 | 4700 |
| Elongation, % | 80 | 80 | 50 | 70 |
| Graves Tear, pi | 700 | 658 | 600 | 685 |
| Shore "D" Hardness | 62/61 | 64/62 | 62/62 | 62/61 |
| 250° F. Heat Sag, inches | 0.44 | 0.28 | 0.74 | 0.66 |
| Flex Recovery, degrees | — | — | — | — |
| Flexibility Modulus × 10³ | | | | |
| −20° F. | 175.3 | 194.4 | 179.1 | 174.4 |
| 72° F. | 76.8 | 87.7 | 85.1 | 84.1 |
| 158° F. | 34.8 | 45.5 | 38.8 | 39.9 |
| Ratio −20° F./158° F. | 5.04 | 4.27 | 4.62 | 4.45 |
| Coefficient of Thermal Expansion in./in., °F., 10⁻⁶ | 75 | 78 | 77 | 77 |

The embodiments of the invention in which an exclusive privilege or property is claimed are defined as follows:

1. A process for preparing a polyurethane elastomer comprising reacting
   (a) an organic polyisocyanate
   (b) one or more polyols having an average molecular weight of about 1000 to about 10,000, having two to eight active hydrogen atoms and,
   (c) from about 1 to 50 parts of an oxyethylated amine selected from the group consisting of 2,4- and 2,6-toluenediamine and 2,4'- and 4,4'-diaminodiphenylmethane having the following structure

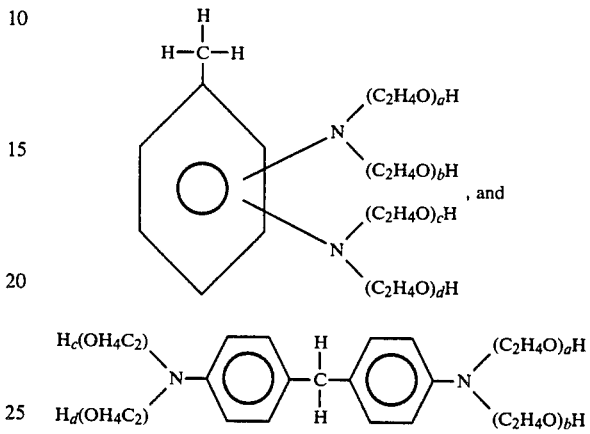

said parts being based on 100 parts of polyol wherein the sum of a+b+c+d is from about 2 to 10.

2. The process of claim 1 wherein said polyol is a graft polymer dispersion in a polyoxyalkylene polyether polyol.

3. The process of claim 1 employing reaction injection molding techniques.

4. The process of claim 1 wherein the ratio of reactants is such that from 0.7 equivalent to 1.4 equivalents of isocyanate are present per equivalent of active hydrogen atoms.

5. The process of claim 1 wherein the organic polyisocyanate is selected from the group consisting of a urethane modified 4,4'-diphenylmethane diisocyanate, a carbodiimide modified 4,4'-diphenylmethane diisocyanate, polymethylene-polyphenyl isocyanates and mixtures thereof.

6. A molded polylurethane-polyurea elastomer prepared in accordance with claim 1.

7. A molded polyurethane-polyurea elastomer prepared in accordance with claims 2, 3, 4, and 5.

* * * * *